United States Patent [19]

Hochhausen

[11] 3,916,954
[45] Nov. 4, 1975

[54] LONG PATH INSULATING DEVICE FOR USE IN A PIPELINE

[76] Inventor: Eugene Hochhausen, 14007 - 80 Ave., Edmonton, Alberta, Canada

[22] Filed: Dec. 10, 1973

[21] Appl. No.: 423,320

[52] U.S. Cl. ............. 138/149; 138/DIG. 2; 285/53; 285/55
[51] Int. Cl.² .... F16L 9/18; F16L 9/14; F16L 13/11
[58] Field of Search ......... 138/149, DIG. 2; 285/48, 285/53, 55, 294; 339/218

[56] References Cited
UNITED STATES PATENTS

| | | | |
|---|---|---|---|
| 2,330,966 | 10/1943 | Gottwald et al. | 138/149 |
| 3,033,729 | 5/1962 | Shobert | 138/DIG. 2 |
| 3,033,730 | 5/1962 | Martin | 138/DIG. 2 |
| 3,213,889 | 10/1965 | Cotman, Jr. | 138/149 X |
| 3,306,635 | 2/1967 | Ferguson | 285/55 |
| 3,686,747 | 8/1972 | Bagnulo | 285/53 X |
| 3,705,735 | 12/1972 | Davidson et al. | 285/55 X |

FOREIGN PATENTS OR APPLICATIONS

| | | | |
|---|---|---|---|
| 1,150,047 | 4/1969 | United Kingdom | 285/53 |

Primary Examiner—John W. Huckert
Assistant Examiner—Charles Gorenstein
Attorney, Agent, or Firm—Ernest Peter Johnson

[57] ABSTRACT

The device is an insulating nipple which is inserted into a pipeline. It comprises an inner, tubular, glass-reinforced, epoxy plastic liner, a steel nipple surrounding the liner and having a circumferential gap cut through its wall, and a steel jacket sleeve surrounding the nipple and extending between its threaded ends. Epoxy plastic is used to fill the annular spaces, between the liner and nipple and nipple and sleeve, as well as the gap. The insulated gap interrupts the movement of ground currents along the pipeline, and the liner functions to prevent current skip across the gap through the pipeline fluid. The device is capable of being used at high pressures, in the order of 1,500 p.s.i. or greater.

5 Claims, 8 Drawing Figures

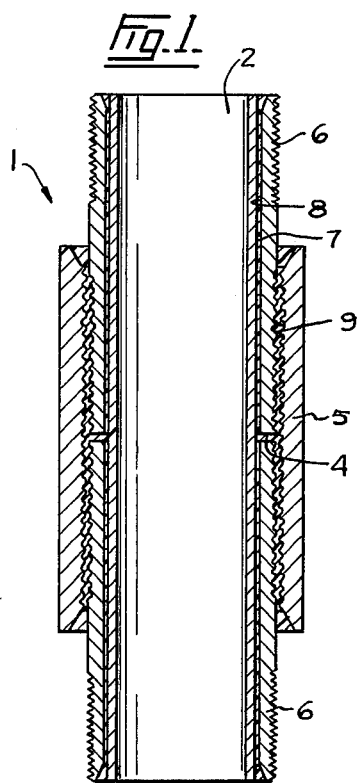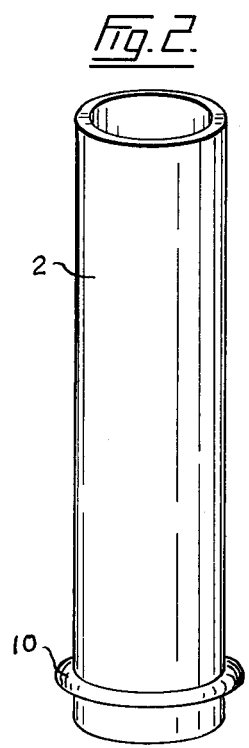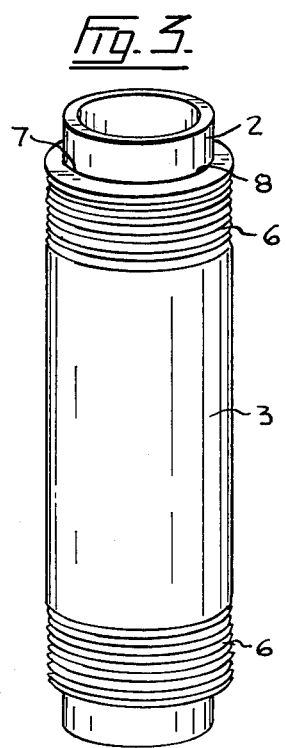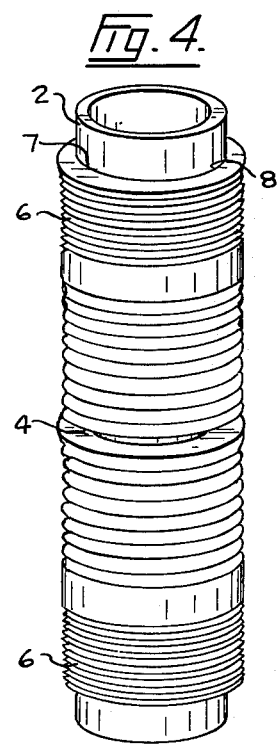

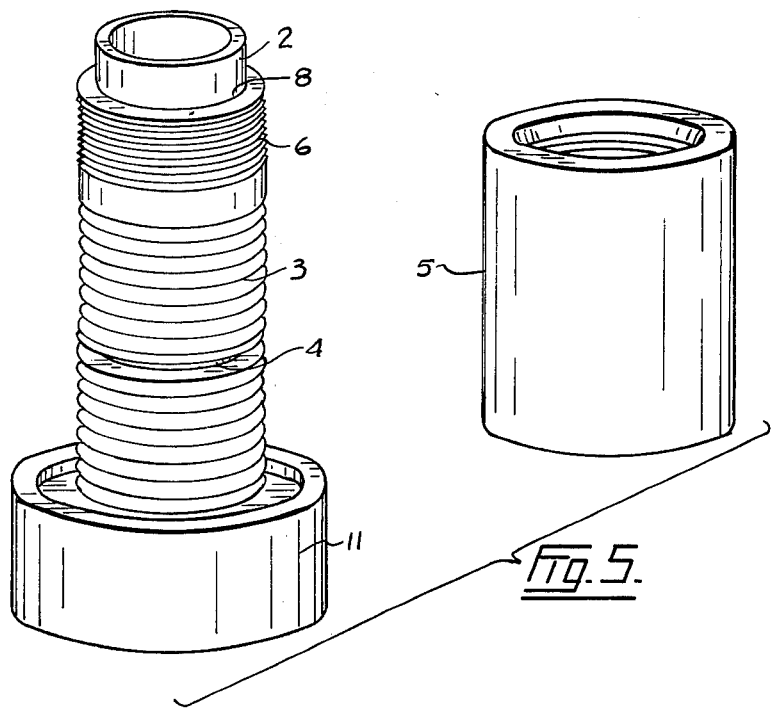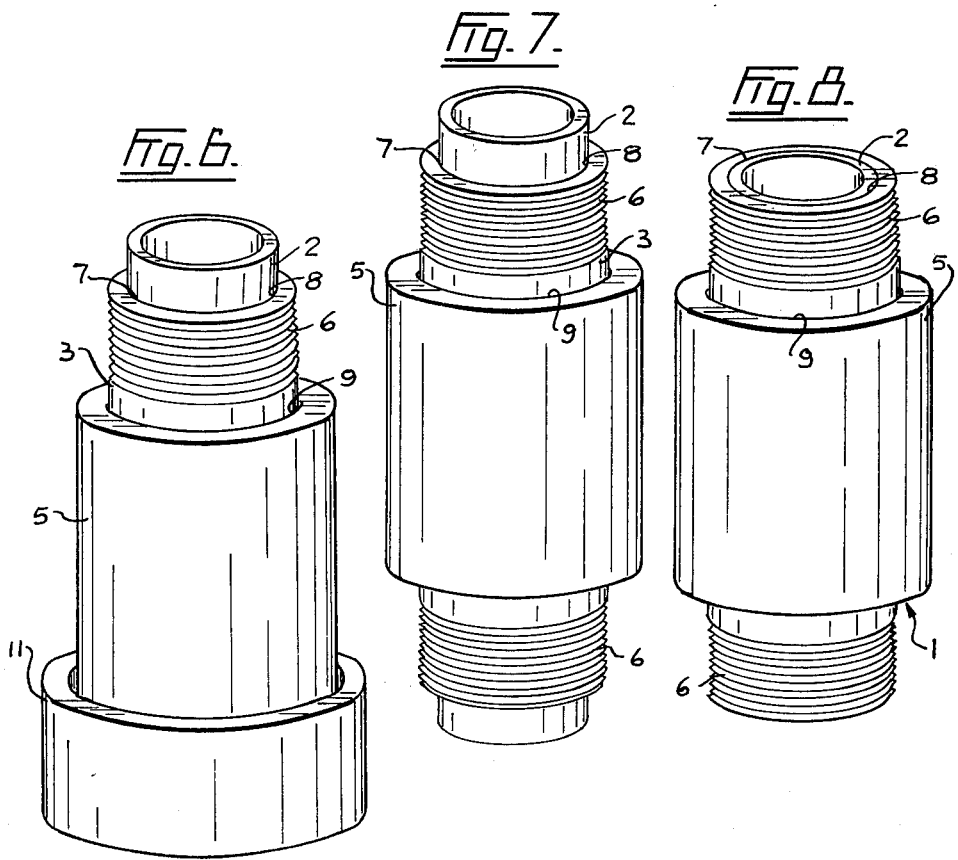

LONG PATH INSULATING DEVICE FOR USE IN A PIPELINE

BACKGROUND OF THE INVENTION

This invention relates to a long path insulating device for use in a steel pipeline.

The passage of ground current along an oilfield water injection or production flow line is undesirable as it leads to corrosion of the equipment at the end of the line, as well as of the line itself. It is conventional to provide a non-conductive device in the line to interrupt the movement of electricity therealong. The present invention is an improvement of one such device, known in the industry as a long path insulating device.

Long path insulating devices commonly comprise two concepts: First, the steel pipeline is cut and the gap or break is filled with insulating material to prevent the passage of electricity thereacross; second, the gap is bridged by a non-conductive tubular liner, attached to the inside surface of the pipeline, of such a length that the current cannot skip the gap by flowing through the fluid in the line.

Heretofore, the commercially available long path insulating devices of which I am aware have not been usable for prolonged periods of time at the high pressures, e.g. 1,500 p.s.i. or higher, associated with some pipelines.

SUMMARY OF THE INVENTION

It is therefore one object of this invention to provide an insulating device which utilizes the combination of an insulation-filled gap and an internal, non-conductive liner, and provides them in a form which is capable of withstanding relatively high line pressure, in the order of 1,500 to 2,500 p.s.i., for a prolonged period of time without breakdown.

It is another object of the invention to provide a simple and inexpensive method for fabricating the improved insulating device.

In accordance with the invention, I provide an insulating device comprising four tubular members positioned in concentric, spaced-apart relationship. More particularly, the device comprises: a rigid, glass-reinforced, thermo-setting plastic liner; a pair of coaxial steel tubes closely surrounding the liner and spaced apart longitudinally to form a narrow gap; and an outer steel jacket sleeve bridging the gap and surrounding the tubes. The annular spaces (between the liner and tubes and the tubes and jacket sleeve) and the gaps are filled with a solid, non-conductive bonding agent which is capable of resisting pressure up to 4,000 p.s.i. without being extruded. The bonding agent rigidly bonds the members together to form a sealed and solid unit.

The product has certain advantages. For example, the combination of the selected liner, a narrow gap, a narrow annular space between the liner and tubes, and the selected bonding agent results in a long path insulating device having a unique capacity to contain fluid under high pressure. In addition, the device successfully interrupts electrical current flow at the gap and prevents electrical current skip across the gap through the pipeline fluid. The device is simple and inexpensive to fabricate. It can be installed in the pipeline using threaded, flanged, welded or grooved end connections. The device is sturdy and does not require special handling during installation, as is the case with most other long path insulating devices. Finally, the product is a one component unit which does not require assembly of parts during field installation.

DESCRIPTION OF THE DRAWING

In the drawing:

FIG. 1 is a side view in section of the insulating device; and

FIGS. 2–8 are a series of perspective side views illustrating the sequence of operations involved in the fabrication of the product.

DESCRIPTION OF THE PREFERRED EMBODIMENT

In general, the device 1 comprises a liner 2 generally coextensive with and surrounded by a pair of steel tubes 3. The tubes 3 are spaced apart longitudinally to form a gap 4. An outer jacket sleeve 5 surrounds the tubes 3 and is positioned intermediate the end portions 6 of the tubes 3. A bonding agent 7 fills the first annular space 8 between the liner 2 and tube 3, the gap 4 and the second annular space 9 between the tubes 3 and sleeve 5.

The invention will now be described with reference to a three-inch diameter device. In the first step of the process, a sand-blasted 2.875 inch O.D. by 0.020 inch wall by 11.0 inch length tubular, glass-reinforced, epoxy liner 2, having an ultimate bursting pressure within the range 2,500–4,000 p.s.i. when tested at 75°F in an unsupported state, is provided. The liner 2 is then encircled with first packing means, such as the O-ring 10. An internally sand blasted, standard, threaded, steel nipple 3 (3.5 inch O.D. by 3 inch I.D.) is placed substantially concentrically over the liner 2. It will be noted that the first annular space 8 has a narrow width, on the order of 0.07 inches; it is sealed at its bottom end by the O-ring 10. A solid, non-conductive bonding material is then poured into the first annular space 8, to fill it, and allowed to harden. A liquid, thermo-setting plastic, preferably a low viscosity, 100 percent solids epoxy resin, containing a curing agent, may be used for this purpose. One suitable plastic system of this type is available from Sika Chemical of Canada Limited, Point Claire, under the trade mark Colma-Dur LV. This material gives a filling which is capable of withstanding a pressure of up to 4,000 p.s.i. without extruding from the narrow annular space 8. Once the epoxy has hardened, the outer surface of the nipple 3 is serrated and a narrow, circumferential gap 4 is cut through the wall of the nipple 3 to the liner 2. The width of the gap 4 is preferably less than the wall thickness of the liner 2, but must be wide enough so that, when it is filled with bonding material, ground currents will not skip across it.

The nipple 3, which has now been divided into two tubes, is then placed in a jig 11 so as to protect the lower threaded portion thereof and encircle it with packing. An internally serrated steel jacket sleeve 5 is then placed substantially concentrically over the tube 3. Epoxy resin and curing agent, as previously described, are then poured into the annular space 9 and allowed to harden.

The product has been pressure tested to 5,500 p.s.i. without damage. It has been utilized in oilfield flow lines operating at pressures as high as 2,000 p.s.i. without failure.

It will be readily understood that minor changes in the size, form, material and construction of the various parts of my improved insulating device for a particular pipe size may be made and substituted for those herein shown and described, without departing from the spirit of my invention, the scope of which is set forth in the appended claims.

What is claimed is:

1. A long path insulating device for use in a pipeline carrying fluid, comprising:
   a rigid, non-conductive, glass-reinforced, thermosetting plastic tube;
   a pair of coaxial, steel tubes surrounding the plastic tube and spaced apart longitudinally to form a narrow gap;
   the wall thickness of the plastic tube being greater than the width of the gap;
   a tubular, steel jacket sleeve surrounding the steel tubes and positioned intermediate the outer ends thereof;
   said plastic and steel tubes forming a first annular space between them and said steel tubes and sleeve forming a second annular space between them; and
   a solid, non-conductive bonding material filling the first and second annular spaces and the gap to bond the tubular parts together to form a sealed and solid unit, said bonding material when in place in the device being capable of resisting pressure up to 4,000 p.s.i. without being extruded;
   said plastic tube extending longitudinally beyond each edge of the gap a sufficient distance to prevent current skip when the device is operative.

2. The device as set forth in claim 1 wherein:
   the glass-reinforced plastic tube has an ultimate bursting pressure in the range 2,500 p.s.i. to 4,000 p.s.i. when tested at 75°F in an unsupported state.

3. The device as set forth in claim 2 wherein: the bonding material is epoxy plastic.

4. The device as set forth in claim 3 wherein:
   the plastic tube is substantially coextensive with the steel tubes.

5. The device as set forth in claim 3 wherein:
   the outer surfaces of the steel tubes and the inner surface of the jacket sleeve are serrated.

* * * * *